(12) United States Patent  
Brenner (10) Patent No.: US 7,992,150 B2
(45) Date of Patent: *Aug. 2, 2011

(54) METHOD AND APPARATUS FOR AWAKENING CLIENT THREADS IN A MULTIPROCESSOR DATA PROCESSING SYSTEM

(75) Inventor: Larry Bert Brenner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 84 days.

This patent is subject to a terminal disclaimer.

(21) Appl. No.: 12/129,329

(22) Filed: May 29, 2008

(65) Prior Publication Data

US 2008/0235686 A1   Sep. 25, 2008

Related U.S. Application Data

(63) Continuation of application No. 11/227,028, filed on Sep. 15, 2005, now abandoned.

(51) Int. Cl.
    G06F 9/46   (2006.01)
(52) U.S. Cl. ....................................................... 718/102
(58) Field of Classification Search .................. 718/106, 718/102
    See application file for complete search history.

(56) References Cited

U.S. PATENT DOCUMENTS

| 5,745,778 | A | * | 4/1998 | Alfieri | 712/1 |
| 5,752,031 | A | * | 5/1998 | Cutler et al. | 718/103 |
| 5,826,081 | A | * | 10/1998 | Zolnowsky | 718/103 |
| 5,872,972 | A | * | 2/1999 | Boland et al. | 718/102 |
| 6,006,299 | A | * | 12/1999 | Wang et al. | 710/108 |
| 6,173,308 | B1 | * | 1/2001 | Hilditch et al. | 718/106 |
| 6,243,788 | B1 | * | 6/2001 | Franke et al. | 711/3 |
| 6,260,057 | B1 | * | 7/2001 | Eykholt et al. | 718/102 |
| 6,434,590 | B1 | * | 8/2002 | Blelloch et al. | 718/102 |
| 6,438,573 | B1 | * | 8/2002 | Nilsen | 718/100 |
| 6,728,959 | B1 | * | 4/2004 | Merkey | 718/102 |
| 6,735,769 | B1 | | 5/2004 | Brenner et al. | |
| 6,748,593 | B1 | * | 6/2004 | Brenner et al. | 718/105 |
| 7,137,115 | B2 | * | 11/2006 | Sakamoto et al. | 718/102 |
| 7,383,396 | B2 | * | 6/2008 | Wyman | 711/141 |
| 2001/0025295 | A1 | * | 9/2001 | Kawachiya et al. | 709/106 |
| 2003/0195920 | A1 | | 10/2003 | Brenner et al. | |
| 2003/0236815 | A1 | | 12/2003 | Brenner et al. | |
| 2004/0010667 | A1 | | 1/2004 | Brenner | |
| 2004/0019679 | A1 | * | 1/2004 | E et al. | 709/226 |
| 2005/0080824 | A1 | | 4/2005 | Vaidyanathan et al. | |
| 2005/0210472 | A1 | | 9/2005 | Accapadi et al. | |
| 2006/0036810 | A1 | | 2/2006 | Accapadi et al. | |
| 2006/0123423 | A1 | | 6/2006 | Brenner | |

OTHER PUBLICATIONS

"Lock priority boosting in an MP system with multiple run queues", IBM Research Disclosure 441169, Jan. 2001, p. 174. Brenner, "Efficient Tracking of Lock Ownership for Recovery Purposes", IBM Technical Disclosure Bulletin, 92A 62737//KI8910133, Pub. No. 4b, Sep. 1992, pp. 445-446.
Cook et al., "Threat Blcok/Wake Up to Avoid Race Conditions in Multitasking Multithreaded Operating Systems", IBM Technical Disclosure Bulletin, 91A 61524//BC8890334, Pub. No. 1, Jun. 1991, pp. 219-221.

* cited by examiner

Primary Examiner — Meng A An
Assistant Examiner — Blake Kumabe
(74) Attorney, Agent, or Firm — Yee & Associates, P.C.; Matthew W. Baca (57) ABSTRACT

A computer implemented method, a data processing system, and computer usable program code for improving thread posting efficiency in a multiprocessor data processing system are provided. Aspects of the present invention first receive a set of threads from an application. The aspects of the present invention then group the set of threads with a plurality of processors based on a last execution of the set of threads on the plurality of processors to form a plurality of groups. The threads in each group in the plurality of groups are all last executed on a same processor. The aspects of the present invention then wake up the threads in the plurality of groups in any order.

15 Claims, 9 Drawing Sheets

```
/*                              Copyright IBM Corporation 2005
 * NAME:  thread_post_many
 *
 * FUNCTION:  Posts one or more threads sleeping in thread_wait
 *            It will ignore exited threads, but will stop posting
 *            and return a failure with EPERM if attempting to post to a
 *            more privileged thread. The failed thread id is passed
 *            back to the user.
 *
 * EXECUTION ENVIRONMENT:
 *     This procedure can be called from the process environment only.
 *
 * NOTES:
 *     System call.
 */
int     howManyPosts = 1;              /* number times to post to same RQ */
int
thread_post_many(int nthreads, tid_t *tidp, tid_t *erridp)
{
        tid_t          *ktidp;         /* array of TIDs to be posted */
        tid_t          tid;
        ut_error_t     *errorp;
        ptr64          tidp64 = (ptr64)tidp;
        ptr64          erridp64 = (ptr64)erridp;
        int            rc;
        int            i;
        int            count = 0;      /* number of ESRCH threads */
        int            is64 = IS64U;
        tid32_t        *ktidp32;
        tid64_t        *ktidp64;
        int            utid_size;      /* Size of tid_t for caller */
        int            not_privd;      /* privcheck result */
        uid_t          effuid;
        uid_t          realuid;
        struct pvthread      *tv;      /* target thread to be posted */
        struct pvproc  *pv;            /* target proc to be posted */
        int            our_rc;         /* error we will set */ short          headi[MAXCPU];  /* per-cpu indices to TID list */
        short          *nexti;         /* + link indices follow the TIDs */
        int            max_cpuid;      /* last logical cpu with TIDs to post */
        int            numberPosts;    /* number times to post in a group */

ASSERT(csa->prev == NULL);
```

FIG. 3B  FROM FIG. 3A

Copyright IBM Corporation 2005

```
#ifndef __64BIT_KERNEL
     if (is64) {   /* get all 64 bits of pointer for 64 bit process case */
          tidp64 = get64bitparm((unsigned long)tidp, 1);
          erridp64 = get64bitparm((unsigned long)erridp, 2);
     }
endif errorp = &curthread->t_uthreadp->ut_error;

if (nthreads > MAX_POSTED_THREADS || nthreads <= 0) {
          *errorp = EINVAL;
          return -1;
     } if (tidp64 == NULL) {
          *errorp = EFAULT;
          return -1;
     } utid_size = is64 ? sizeof(tid64_t) : sizeof(tid);
     ktidp = xmalloc((utid_size + sizeof(short)) * nthreads, 3, pinned_heap);
     if (!ktidp) {
          *errorp = ENOMEM;
          return -1;
     }
     nexti = (short *)((long)ktidp + (utid_size * nthreads));

rc = COPYIN(tidp64, ktidp, utid_size * nthreads);
     if (rc) {
          xmfree(ktidp, pinned_heap);
          *errorp = EFAULT;
          return -1;
     } for (i = 0; i < NUM_CPUS(); i++)       /* local run queue indices */
          headi[i] = -1;
     our_rc = 0;
```

300

310 — ktidp line
312 — nexti line
314, 316 — COPYIN line
318 — for loop line
319 — headi line

TO FIG. 3C

FIG. 3C  FROM FIG. 3B

Copyright IBM Corporation 2005

```
not_privd = privcheck(BYPASS_DAC_KILL);
    effuid = getuidx(ID_EFFECTIVE);
    realuid = getuidx(ID_REAL);
    max_cpuid = -1;

ktidp32 = (tid32_t *)ktidp;        /* small TIDs for 32bit mode */
    ktidp64 = (tid64_t *)ktidp;        /* large TIDs for 64bit mode */
320 ┌ for (i = 0; i < nthreads; i++) {
        if (is64)
            tid = ktidp64[i];
        else
            tid = ktidp32[i];
        tv = TID_VALIDATE(tid);

if (!tv                    ||
            tv->tv_tid != tid      ||
            tv->tv_state == TSNONE ||
            tv->tv_state == TSZOMB)
        {
            count++;
            our_rc = ESRCH;         /* this guy's no good */
            continue;               /* but we keep on going */
        } pv = tv->tv_pvprocp;
        if (not_privd                   &&
            (effuid != pv->pv_uid)      &&
            (effuid != pv->pv_suid)     &&
            (realuid != pv->pv_uid)     &&
            (realuid != pv->pv_suid))
        {
            our_rc = EPERM;         /* this guy's no good */
            nthreads = i;           /* and we stop here */
            break;
        } 326

324 ┐ nexti[i] = headi[tv->tv_affinity];   /* link by affinity */
       headi[tv->tv_affinity] = i;
        max_cpuid = MAX(tv->tv_affinity, max_cpuid);
    }
```

TO FIG. 3D

FROM FIG. 3C      *FIG. 3D*

Copyright IBM Corporation 2005     300

```
                numberPosts = howManyPosts;    /* number times to post to same RQ */
330 ──  for (i = 0; i <= max_cpuid; i++) {
            int k;                 /* number awakened under lock hold */
332 ──      int j = headi[i];      /* index to first TID */
            if (j != -1) {
                struct run_queue *rqi;
                int ipri;  /* saved interrupt priority    */ rqi = GET_PPDA(i)->run_queue;   /* i-th run queue */
                k = 0;                  /* no threads awakened yet */
                ipri = disable_lock(INTMAX, &rqi->run_queue_lock);
334 ──          do {
                           336        338
                    if (++k > numberPosts) {
                 340 ── unlock_enable_mem(ipri,
                                         &rqi->run_queue_lock);
                        (void)disable_lock(INTMAX,
                                         &rqi->run_queue_lock);
                        k = 0;
                    }
                    if (is64)
                            tid = ktidp64[j];
                    else
                            tid = ktidp32[j];

342 ── tv = PVTHREADPTR(tid);          /* TID slot */
#ifdef _POWER_MP
                344 ── if (!simple_lock_try(&tv->tv_lock_d)) {
                            simple_unlock(&rqi->run_queue_lock); ── 346
                        348 ── simple_lock(&tv->tv_lock_d);
                            simple_lock(&rqi->run_queue_lock); ── 350
                    }
endif
                    rc = et_post_rc(EVENT_KIPC, tid, tv, rqi); ── 352
                353 ── simple_unlock(&tv->tv_lock_d);
                    if (rc) {
                            count++;   /* only ESRCH possible here */
                            if (!our_rc)
                                    our_rc = rc;
                    }
                    j = nexti[j];
                } while (j != -1);
```

TO FIG. 3E

FIG. 3E   FROM FIG. 3D

Copyright IBM Corporation 2005

```
            unlock_enable_mem(ipri, &rqi->run_queue_lock);
        }
    }

/* don't return ESRCH error unless all threads non-existent or exited */
    if (our_rc == ESRCH && count != nthreads) {
        our_rc = 0;
    }

/* if error, we will try to copy failing thread */
    if (our_rc == EPERM && erridp64) {
        if (is64)
354 ─── copyout64((void *)&ktidp64[nthreads],
                                         erridp64, utid_size);
        else
            copyout((void *)&ktidp32[nthreads],
356                                      erridp, utid_size);
    }
    xmfree(ktidp, pinned_heap);
    if (our_rc) {
        *errorp = our_rc;
        our_rc = -1;
    } return our_rc;
}
```

METHOD AND APPARATUS FOR AWAKENING CLIENT THREADS IN A MULTIPROCESSOR DATA PROCESSING SYSTEM

This application is a continuation of application Ser. No. 11/227,028, filed Sep. 15, 2005, status pending.

BACKGROUND OF THE INVENTION

1. Field of the Invention

The present invention relates generally to a multiprocessor data processing system. In particular, the present invention relates to improving thread posting efficiency in a multiprocessor data processing system. Still more particularly, the present invention relates to improving thread posting efficiency in a multiprocessor data processing system by awaking client threads based on a given central processing unit on which the client threads are expected to run.

2. Description of the Related Art

The UNIX operating system is a multi-user operating system supporting a hierarchical directory structure for the organization and maintenance of files. In contrast with a single operating system, UNIX is a class of similar operating systems. Dozens of different implementations of UNIX are present, such as Advanced Interactive eXecutive (AIX), a version of UNIX produced by International Business Machines Corporation. Each implementation is similar to use because each of these implementations provides a core set of basic UNIX commands.

The UNIX operating system is organized at three levels: the kernel, shell, and utilities. The kernel is the software that manages a user program's access to the system hardware and software resources, such as scheduling tasks, managing data/file access and storage, and enforcing security mechanisms. The shell presents each user with a prompt, interprets commands typed by a user, executes user commands, and supports a custom environment for each user. The utilities provide tools and applications that offer additional functionality to the operating system.

In the AIX operating system, users may put one or more threads to sleep by invoking a thread_wait command in the user mode and subsequently waking up each thread by invoking a thread_post user command. For large transaction centric applications that comprise thousands of threads, such as DB2 Universal Database and Oracle, thread posting efficiency becomes an issue. DB2 Universal Database is a product available from International Business Machines Corporation, and Oracle is a product available from Oracle Corporation.

In particular, these applications perform database logging on a single central processing unit (CPU) or a processor of a multiprocessor data processing system. However, if the multiprocessor data processing system has 128 processors all generating logging requests, database logging becomes a bottleneck since only one or a small number of processors is used as a logger. To alleviate this problem, improvements have been made that reduce database logging overhead by allowing the logger task to wake up all of its client threads in a single system call. This system call is known as thread_post_ many.

Thread_post_many system call wakes up all of its client threads by issuing the equivalent of a thread_post system call to individual threads in a loop. However, thread_post_many system call only solves part of the problem. Each update that threads running on various of the 128 processors try to perform requires a logging. In addition, only one processor may be used as a logger. Therefore, a relatively large number of threads have to wait until the single logging thread completes previous logging. Although each wait only costs a few milliseconds, the total waiting time becomes a problem when there are 127 processors generating logging requests but only 1 processor handling them. Greater efficiency improvement is needed for the large number of computing threads that result from the increasing number of logging requests.

SUMMARY OF THE INVENTION

The aspects of the present invention provide a computer implemented method, a data processing system, and computer usable program code to improve thread posting efficiency in a multiprocessor data processing system. A set of threads is received from an application. The set of threads is grouped with a plurality of processors based on a last execution of the set of threads on the plurality of processors to form a plurality of groups. The threads in each group in the plurality of groups are all last executed on a same processor. The threads in the plurality of groups are wakened up in any order.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
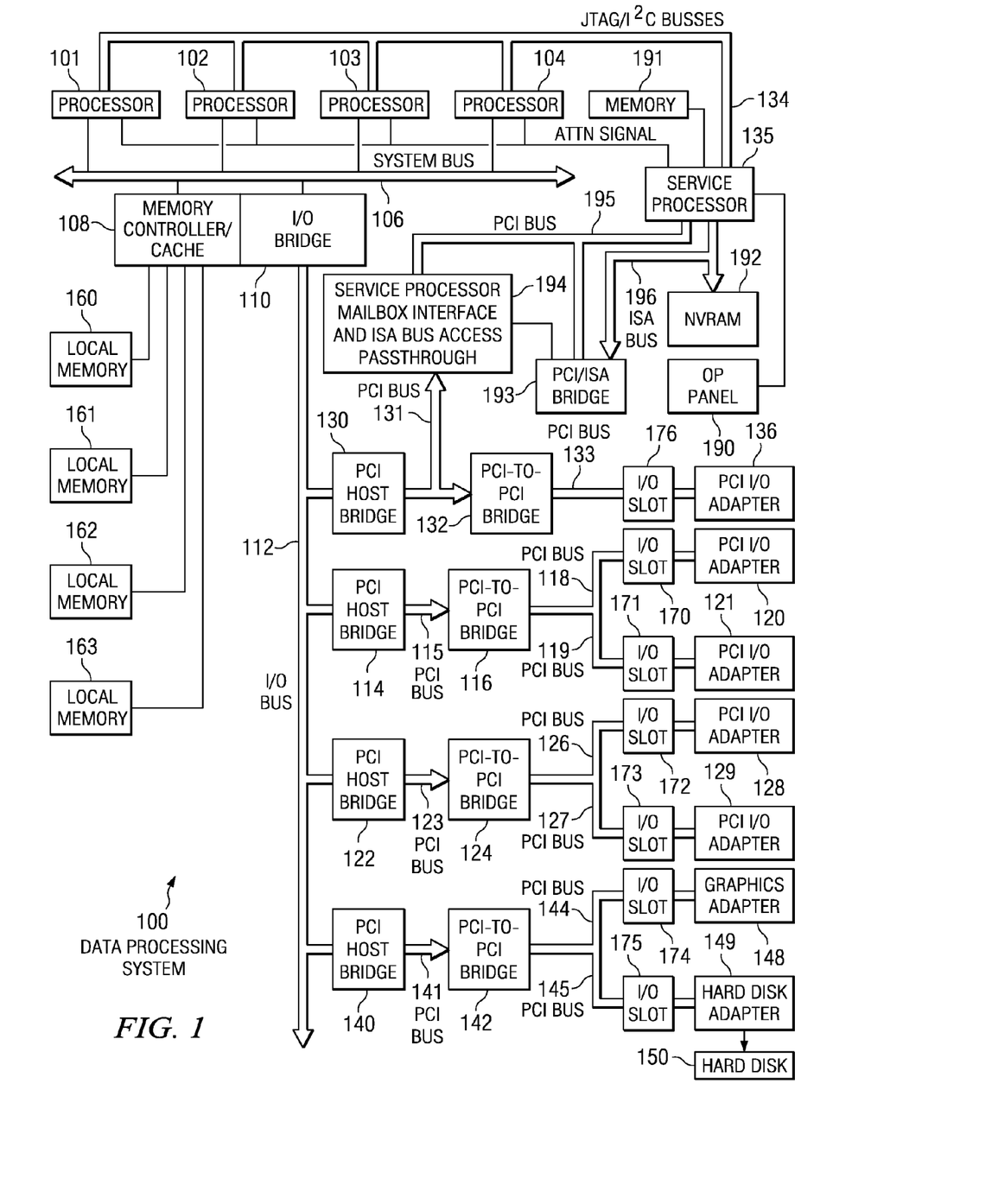
FIG. 1 is a block diagram of a data processing system in which exemplary aspects of the present invention may be implemented.

With reference now to the figures, and in particular with reference to FIG. 1, a block diagram of a data processing system in which exemplary aspects of the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer™, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bridge 110 is connected to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of processors 101-104, and memory from local memories 160-163 is assigned to one of the three partitions. In these examples, local memories 160-163 may take the form of dual in-line memory modules (DIMMs), for example. DIMMs are not normally assigned on a per DIMM basis to partitions. Instead, a partition will get a portion of the overall memory seen by the platform. For example, processor 101, some portion of memory from local memories 160-163, and PCI I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. As an example, one instance of the Advanced Interactive Executive™ (AIX™) operating system may be executing within partition P1, a second instance (image) of the AIX™ operating system may be executing within partition P2, and a Windows™ operating system may be operating within logical partition P3. "Windows" is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers that are clients to data processing system 100.

Additional PCI host bridge 122 may provide an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128-129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

PCI host bridge 130 provides an interface for PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to service processor mailbox interface and ISA bus access pass-through 194 and PCI-to-PCI bridge 132. Service processor mailbox interface and ISA bus access pass-through 194 forwards PCI accesses destined to PCI/ISA bridge 193. NVRAM 192 is connected to ISA bus 196.

Service processor 135 is coupled to service processor mailbox interface and ISA bus access pass-through logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, only Phillips I2C busses or only JTAG/scan busses may replace JTAG/I2C busses 134. All SP-ATTN signals of processors 101, 102, 103, and 104 are connected together to an interrupt input signal of the service processor. Service processor 135 has its own local memory 191 and has access to OP-panel 190.

When data processing system 100 is initially powered up, service processor 135 uses JTAG/I$^2$C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases processors 101-104 for execution of the code loaded into local memory 160-163. While processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all of the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM eServer™ iSeries® Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

The processes of the present invention may be implemented within the kernel of an operating system, such as the AIX operating system. Large transaction centric applications, such as DB2 Universal Database and Oracle may utilize the aspects of the present invention to improve thread posting efficiency. Aspects of the present invention improve thread posting efficiency in a multiprocessor data processing system, such as data processing system 100 in FIG. 1, by replacing the current thread_post_many system call with a new thread_post_many system call that wakes up client threads in a new sequence which is based on the given processor on which each of the client threads is individually expected to run. Instead of waking up client threads in the order that they are inserted by the application, the aspects of the present invention perform a heap sort on the client threads and link all the client threads to be awakened on a given processor together. However, sorting methods other than a heap sort that sort threads based on a given processor may be performed without departing the spirit and scope of the present invention.

In one exemplary implementation, there may be a maximum of 512 threads to be awakened, which are scattered among all 128 processors. For each of the threads to be awakened, a lock that is specific to the processor, known as a run queue lock, needs to be acquired in order to serialize the wake ups before the lock is released. For example, when awakening one thread on one processor and five threads on another processor, an appropriate run queue lock has to be acquired six times. Instead of waking up threads in first-in-first-out (FIFO) fashion as currently performed by the database application, the aspect of the present invention sorts the list of client threads according to processors that the client threads are expected to run on.

As a result of the sort, cycle time can be saved with the aspects of the present invention. The cycle time is saved by setting how many threads are to be awakened per processor. When the number of threads is set to ten, for example, the run queue lock that is required to wake up the ten threads on processor 3 only needs to be acquired once before the lock is released. Otherwise, if the FIFO order as currently used by the application is followed, the run queue lock may need to be acquired up to ten times.

As an alternative to cycle time savings by setting how many threads are to be awakened per processor, memory cache affinity benefits may be achieved with the aspects of the present invention. As threads that are targeted at the same processor are awakened, the internal structures of these threads are linked together on the run queue for that processor. Thus, data required to link these threads onto the list is in the cache as the same list of threads is referenced multiple times consecutively. In this way, memory cache affinity benefit is achieved.

As to the heap sort, since sorting 512 thread wake up requests may be time consuming, the aspects of the present invention make a shortcut. This shortcut runs through the list of client threads only once and links all threads that are expected to execute on the same processor, and hence were placed on the same run queue, together. For example, all threads that are executing on processor 1 are linked together, while all threads that are executing on processor 2 are linked separately. In this way, only one pass through the list of client threads completes the sort.

After sorting and linking the threads by processor, these threads are awakened in an order different from the order in which the application implied by their order in its wakeup list, for example, a reverse order. In other words, when the threads are pushed onto 128 individual stacks, each thread is pulled off the stacks in the opposite direction to be awakened. This is known as a Last-In-First-Out (LIFO) approach. The LIFO approach gives memory cache benefits because the last thread that is pulled off the stack most likely still has data in the cache.

For example, if ten threads recently ran on a given processor, the last thread that ran is the thread that should still have data inside the cache because the earlier threads in the list continued to wait for the logger. Therefore, even though cycle time savings may not be achieved should the function of batching the locking is turned off, memory cache benefits may still be achieved by waking up threads according to the LIFO approach. In addition to LIFO, different orders of waking up threads may be implemented without departing the spirit and scope of the present invention. For example, a user may define a preferred order to wake up the threads.

While the number of threads to be awakened per processor, which holds the lock long enough for a maximum desired number of threads at a time may be adjusted, there are risks involved. In one exemplary implementation, if the number is adjusted to wake up all the threads on a given processor, the application may remain disabled for interrupts for a long time. For example, an interrupt may be delayed during 500 wake ups all directed to a single processor, which results in poor utilization of I/O devices.

On the other hand, if the number is adjusted to wake up only five or ten threads at a time, the aspects of the present invention may release the lock and enable for interrupts, disable for interrupts, and then re-acquire the lock. With this adjustment, while giving up cycle saving benefits, interrupts may be handled more responsively. In addition, between waking up threads on processor 3 and threads on processor 4, the aspects of the present invention are able to keep up with the I/O devices by releasing the lock for run queue 3, enabling for interrupts, disabling for interrupts, and then acquiring the lock for run queue 4. In a preferred embodiment, however, the number of threads to be awakened is adjusted to one thread at a time.

Figure 2:
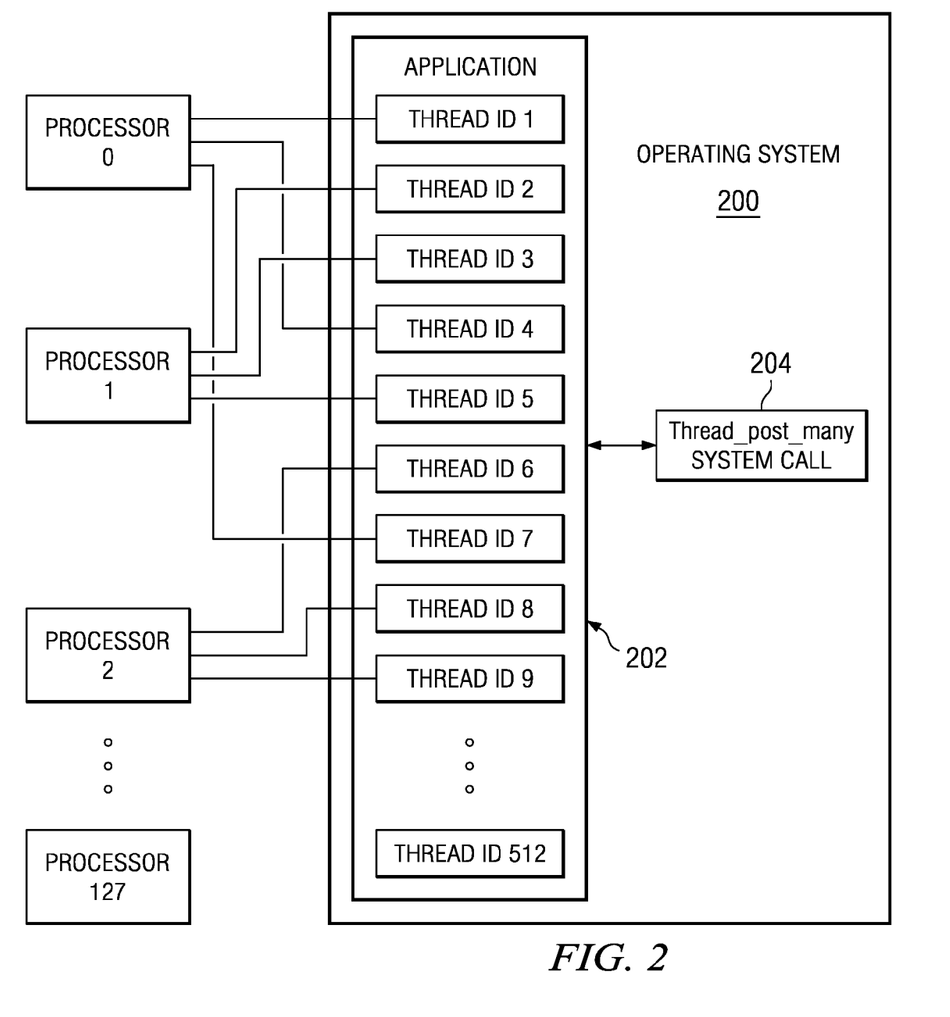
FIG. 2 is a diagram illustrating interactions between aspects of the present invention in accordance with an illustrative embodiment of the present invention.

Turning now to FIG. 2, a diagram illustrating interactions between aspects of the present invention is depicted in accordance with an illustrative embodiment of the present invention. As shown in FIG. 2, application 202 executes within operating system 200 of a multiprocessor data processing system. An example of a multiprocessor data processing system is multiprocessor data processing system 100 in FIG. 1. Within application 202, a number of threads are executed to perform various functions. These threads are identified by their thread IDs. In this example, thread ID 1 to thread ID 9 are executed within application 202. In these examples, a total number of 512 threads and 128 processors may be present in a multiprocessor data processing system.

Thread ID 1 to thread ID 9 may last run on any processor within a multiprocessor data processing system. For example, thread ID 1, thread ID 4, and thread ID 7 last ran on processor 0. Thread ID 2, thread ID 3, and thread ID 5 last ran on processor 1. Thread ID 6, thread ID 8, and thread ID 9 last ran on processor 2. Examples of processor 0, processor 1, and processor 2 include processor 101, 102, and 103 in FIG. 1.

The aspects of the present invention provide a new call, thread_post_many system call 204, which takes the threads waiting within application 202 and sorts them based on which processor each of threads is last ran on. After the threads are sorted, thread_post_many system call 204 selects a subset of threads that last ran on the same processor in the multiprocessor data processing system and wakes up the subset of threads of each processor in any given order.

For example, thread_post_many system call 204 takes the threads that are executing within application 202 and sorts them based on which processor each thread is last ran on. Thread_post_many system call 204 then selects a subset of threads that last ran on the same processor. For example, thread ID 1, thread ID 4, and thread ID 7, which last ran on processor 0. After the subset of threads are selected, thread_post_many system call 204 wakes up the subset of threads in any given order, for example, thread ID 4 may be awakened first, then thread ID 7, and thread ID 1. However, in one embodiment, the threads will be awakened in a LIFO order of thread ID 7, thread ID 4, thread ID 1.

Turning now to FIGS. 3A-3E, diagrams illustrating a new thread_post_many system call for waking up client threads based on a given central processing unit are depicted in accordance with an illustrative embodiment of the present invention. New thread_post_many system call 300 may be implemented with an operating system executing within a data processing system, such as AIX operating system kernel, executing within data processing system 100 in FIG. 1.

Figure 3A:
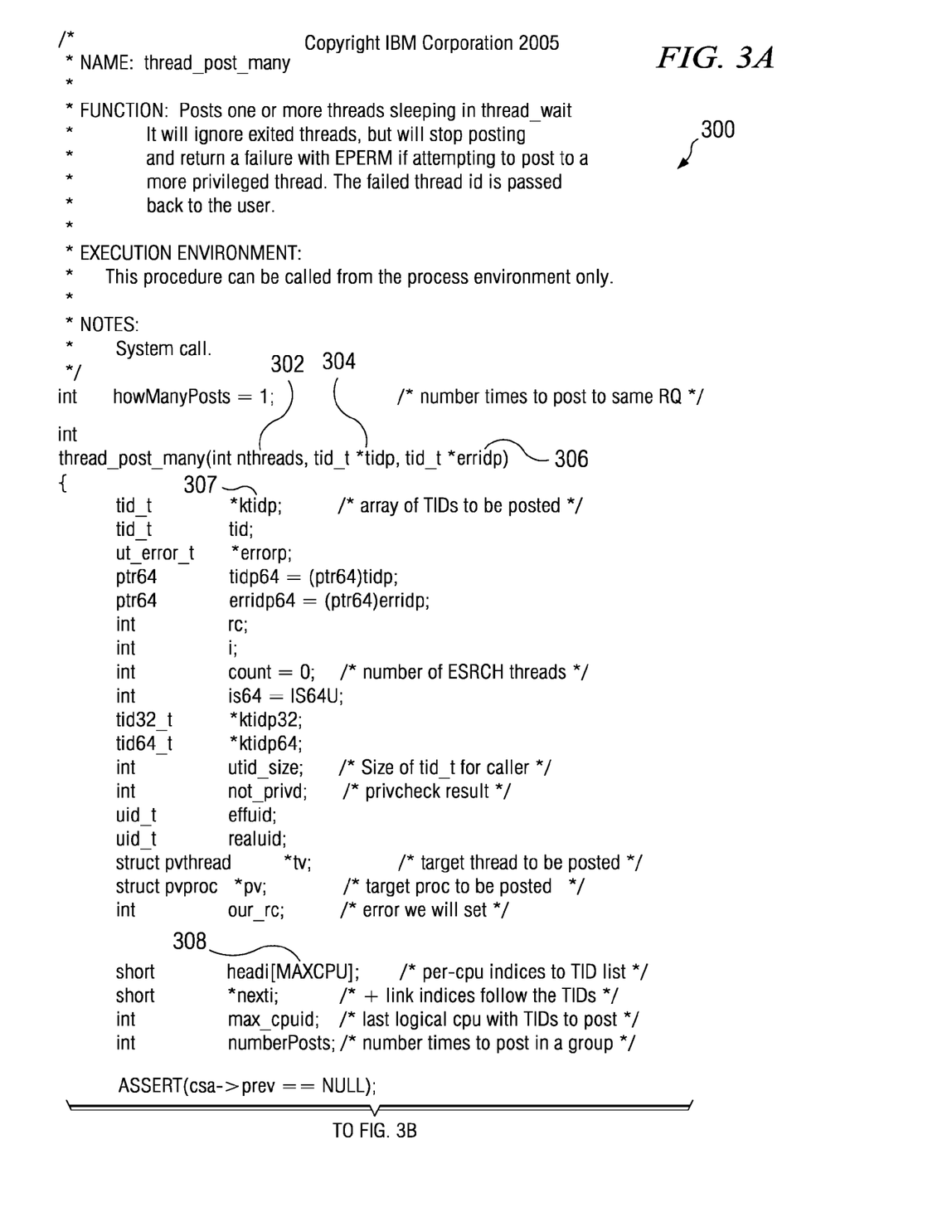
FIGS. 3A-3E are diagrams illustrating a new thread_post_ many system call for waking up client threads based on a given central processing unit in accordance with an illustrative embodiment of the present invention.

As shown in FIG. 3A, in this example implementation, a new thread_post_many system call 300, which takes three input parameters: nthreads 302, tidp 304, and erridp 306. nthreads 302 represents the number of threads to wake up in an application. tidp 304 represents a thread identifier pointer for an array of thread identifiers, for example, an array of 173 thread IDs. erridp 306 represents an error pointer, pointing to where errors will be logged. In this example implementation, thread_post_many system call 300 may accommodate 32 bit and 64 bit user programs. Thus, the sizes of thread IDs, tidp 304, and error pointer, erridp 306, are scaled accordingly.

Figure 3B:
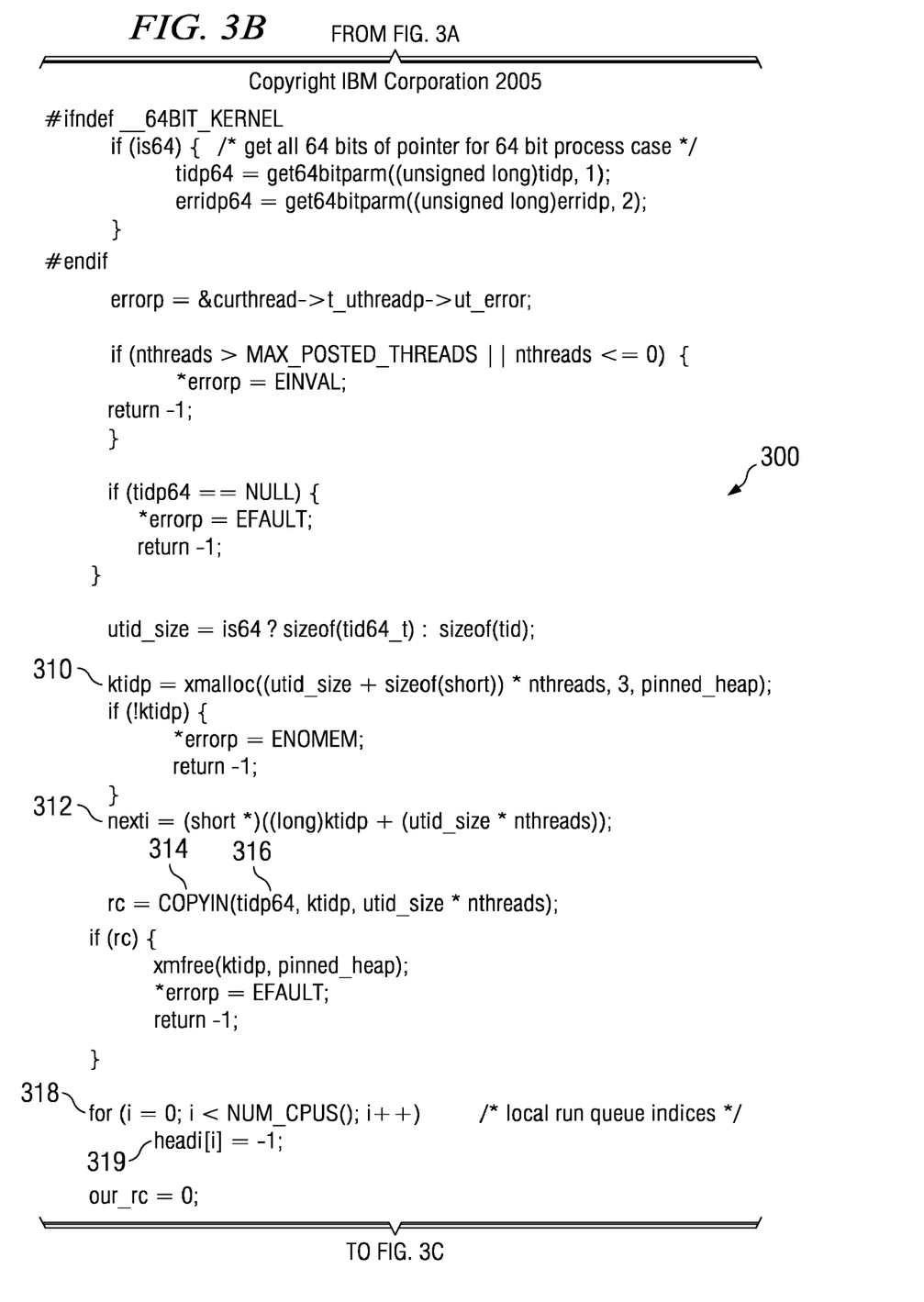

Turning now to FIG. 3B, a diagram illustrating thread_post_many system call 300 in continuation of FIG. 3A is depicted in accordance with an illustrative embodiment of the present invention. As shown in FIG. 3B, when thread_post_many system call 300 receives a user array, it allocates memory storage, ktidp 310, for the size of the thread IDs of the user array plus the size of a short integer times the number of user threads, in order to organize the threads by processor. For example, thread_post_many system call 300 may allocate 173 user thread IDs plus 173 short integers in order to create 128 [MAXCPU] linked lists.

Next, thread_post_many system call 300 identifies nexti 312, which is a pointer to link indices at an address following all of the thread IDs. In this case, the memory storage of a single request is partitioned into a big area for the thread IDs and a small area for subscript numbers. Next, thread_post_many system call 300 uses a kernel service, COPYIN 314, which goes to the user's memory and fetches what is in the user's memory, for example, tidp64 316, to the pinned memory that thread_post_many system call 300 allocated previously, ktidp 310. This enables thread_post_many system call 300 to avoid issues such as page faults later.

Next, thread_post_many system call 300 includes for loop 318 which sets all list headers to −1 to initialize the processor subscripts. headi[i] 319 is defined as headi[MAXCPU] 308 in FIG. 3A. MAXCPU is the maximum number of processors that are supported on a given multiprocessor data processing system. Thus, for a 128 processors system, MAXCPU is 128 and headi[i] 319 represents 128 list headers. Index i represents a particular processor, for example, headi[3] represents a list header for processor 3. The value of ktidp[i] 307 in FIG. 3A, on the other hand, represents the thread ID that is to be awakened. Ktidp is short-hand for a ktidp32 or ktidp64, which reflects whether the application is running in a 32-bit or 64-bit mode. If headi[i] has a value of −1, there are no threads to be awakened on processor i. If headi[i] has value j, it represents the thread identified by ktidp[j], the j-th thread ID provided by the application's tidp array 304 in FIG. 3A.

headi[i] 319 gives a construct similar to a linked list that includes all the rest of the threads to be awakened on a given processor. Since headi[i] 319 is only a short integer, it is not enough to hold pointers, which are either 32 or 64 bits long depending on the kernel. Therefore, instead of using pointers, thread_post_many system call 300 uses processor subscripts to save memory. In other words, instead of using a linked list, which is a data structure in which each element contains an address of the next element, thread_post_many system call 300 uses a data structure in which each element contains a subscript number identifying the next element.

Figure 3C:
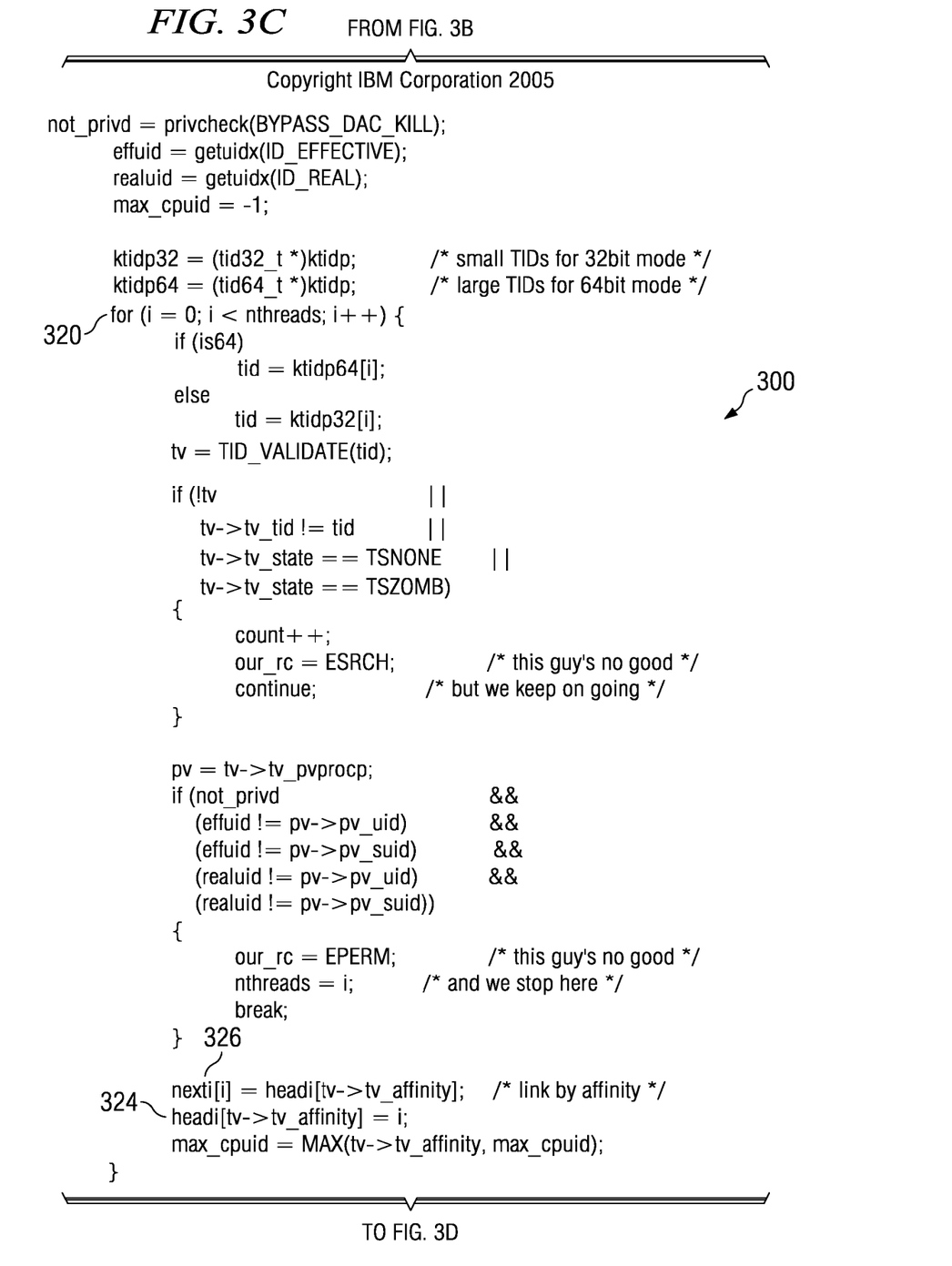

Turning now to FIG. 3C, a diagram illustrating thread_post_many system call 300 in continuation of FIG. 3B is depicted in accordance with an illustrative embodiment of the present invention. As shown in FIG. 3C, after thread_post_many system call 300 runs through a first pass to the list of client threads in the order the threads are passed up by the application, thread_post_many system call 300 determines, for each thread in the list, if it is valid to wake up the thread at this time and where the thread has last ran. First, thread_post_many system call 300 includes for loop 320, which validates each thread to determine if the thread ID is valid and if permission exists to wake up the thread.

Next, for loop 320 determines for each thread in the list where the thread has last ran. For example, if a thread with a thread ID ktidp[0] has last ran on processor 3, thread_post_many system call 300 assigns headi[3] with a value of 0 to represent that this thread is to be awakened on processor 3. After all 512 threads IDs are examined, there may be a possibility that another thread also runs on processor 3. In this case, since there is already a value in the headi[3], thread_post_many system call 300 has to preserve the value that is currently in headi[3]. Thread_post_many system call 300 preserves the value as illustrated in statement 326 as described below.

Continuing with the previous example, if the thread with a thread ID ktidp[0] is passed up by the application as the last thread that is ran on processor 3 thread_post_many system call 300 assigns headi[3] to 0. This step is illustrated by statement 324 in FIG. 3C. Next, thread_post_many system call 300 assigns the old value of headi[3], which is −1, to nexti[0]. This step is illustrated by statement 326 in FIG. 3C. As a result, nexti[0]=−1. Later, should the fifth element of the thread ID list that is passed up from the application, also has an affinity of 3, thread_post_many system call 300 takes the 0 from headi[3] and pushes it into nexti[5]. In this way, if thread ID 5 is to be awakened, nexti[5] is looked up by thread_post_many system call 300, such that thread 0 is to be awakened as well.

For loop 320 illustrates that threads may be linked together by subscripts instead of addresses. For example, thread_post_many system call 300 may pick up headi[i] and get the subscript of some thread in the user original array and use that subscript to determine which thread is next to be awakened up to 128 times. Thus, every thread that is flagged for processor 0, 1, 2 and so on may be awakened in the LIFO order.

Figure 3D:
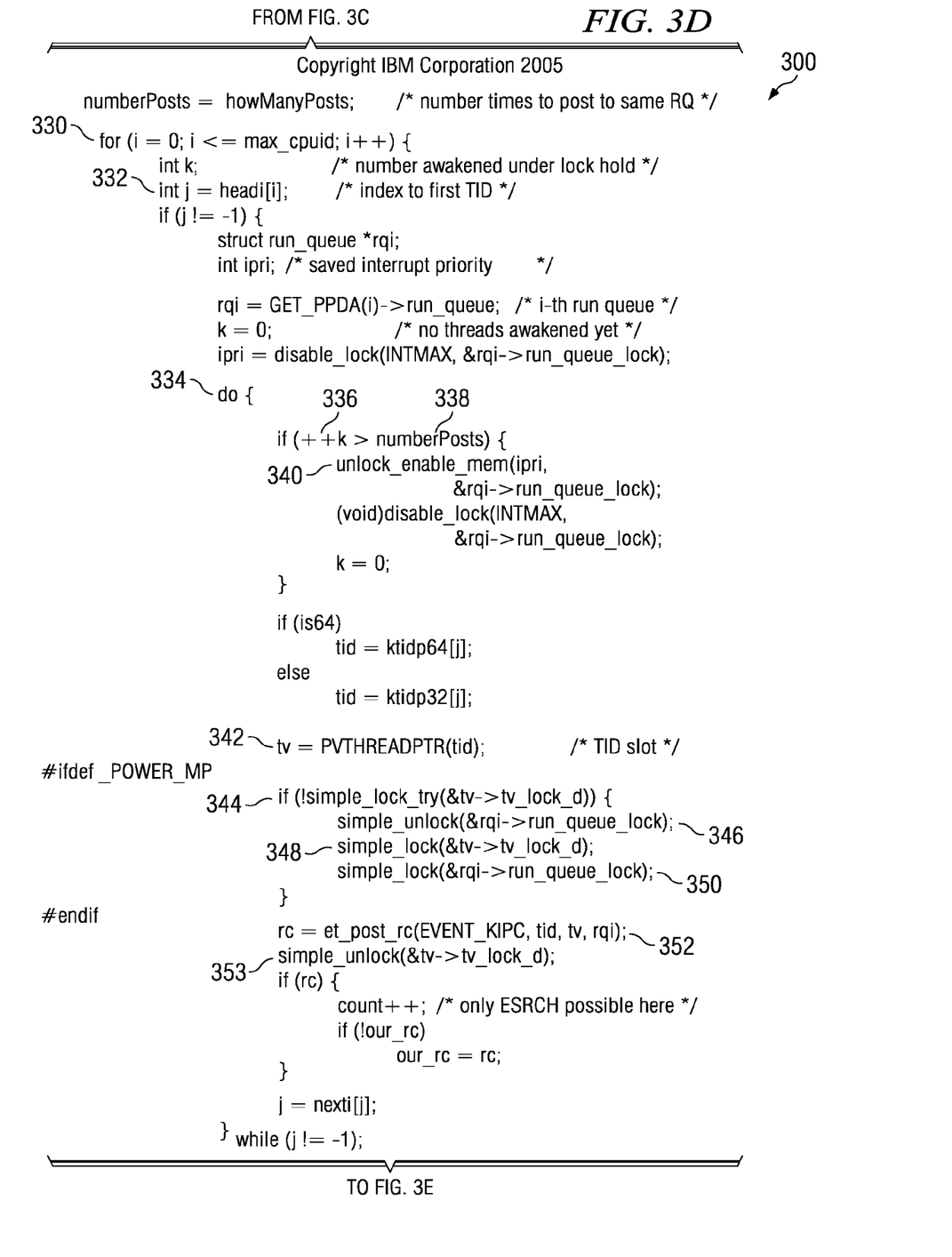

Turning now to FIG. 3D, a diagram illustrating thread_post_many system call 300 in continuation of FIG. 3C is depicted in accordance with an illustrative embodiment of the present invention. As shown in FIG. 3D, after the client threads are sorted and linked, thread_post_many system call 300 includes for loop 330, which loops through each processor that is actually on the multiprocessor data processing system and wakes up the threads for that processor in a LIFO order.

For loop 330 first determines if the value of headi[i], which represents a thread ID that last ran on processor i, is −1. If so, there are no threads to wake up in processor i. This step is illustrated by statement 332 in FIG. 3D. However, if the value of headi[i] is not equal to −1, for loop 330 obtains the run queue for processor i. Then, do-while loop 334 within for loop 330 wakes up all the threads that are collected for each processor until there are no more threads to wake up for the processor, and thus, j=−1.

As described above, the number of threads to be awakened per run queue lock acquisition per processor may be adjusted to avoid holding the lock for too long. Do-while loop 334 provides a variable k 336 to keep track of how many threads have been awakened per processor. NumberPosts 338 is a constant that is adjustable to represent the number of threads to be awakened per processor such that prolonged lock holding may be avoided. In a preferred embodiment, only 1 thread is to be awakened at one time. If the number of threads to be awakened per lock acquisition is exceeded, unlock_enable_mem 340 unlocks the run queue for processor i and enables interrupts, and then disables interrupts and relocks the run queue for processor i. In this way, the lock will only be held for the processing of up to k threads at a time.

For the threads that are awakened, the thread ids are converted into an internal structure pointer. This step is illustrated by statement 342 in FIG. 3D. In order to wake up the threads, not only does the run queue need to be locked, each thread also has to be locked. When obtaining a lock for the thread, a locking hierarchy is involved. A locking hierarchy is a hierarchy that governs the order in which locks may be obtained without running into deadlocks. Deadlock is when two processes are each waiting for the other to complete before proceeding, which results in both processes hanging. The locking hierarchy requires locking the thread prior to locking the run queue. However, aspects of the present invention lock the run queue in order to batch the threads onto the run queue before locking the threads, and thus, are subject to deadlock.

In order to avoid deadlock, do-while loop 334 includes simple_lock_try 344, which acquires the thread lock if it is available. If the thread lock is not available, instead of waiting and spinning, the lock request is failed and an error is returned to the user. If the thread lock is not available, in order to avoid deadlock, the run queue lock is unlocked 346, which occasionally gives up saving cycles, and then the thread is locked 348. Thereafter, the run queue is locked again 350. In this way, thread and run queue locking may be performed in a safe order.

Furthermore, do-while loop 334 also includes an internal service, et_post_rc 352, which provides the ability to wake up the thread on a run queue other than the one that is locked. In most cases, a thread is awakened under the assumption that the thread that is unlocked remains on the processor that it last ran on. Thus, the thread is most likely bound to where it last ran. However, though rare, if a third party thread binds that thread to be run on a different processor, et_post_rc 352, which has the thread lock, detects that the run queue lock obtained was for a wrong run queue. In turn, et_post_rc 352 unlocks the wrong run queue, locks the correct run queue, wakes up the thread, unlocks the correct run queue, and relocks the wrong run queue. This is known as hidden error recovery. After the thread is awakened, it is then unlocked 353.

Figure 3E:
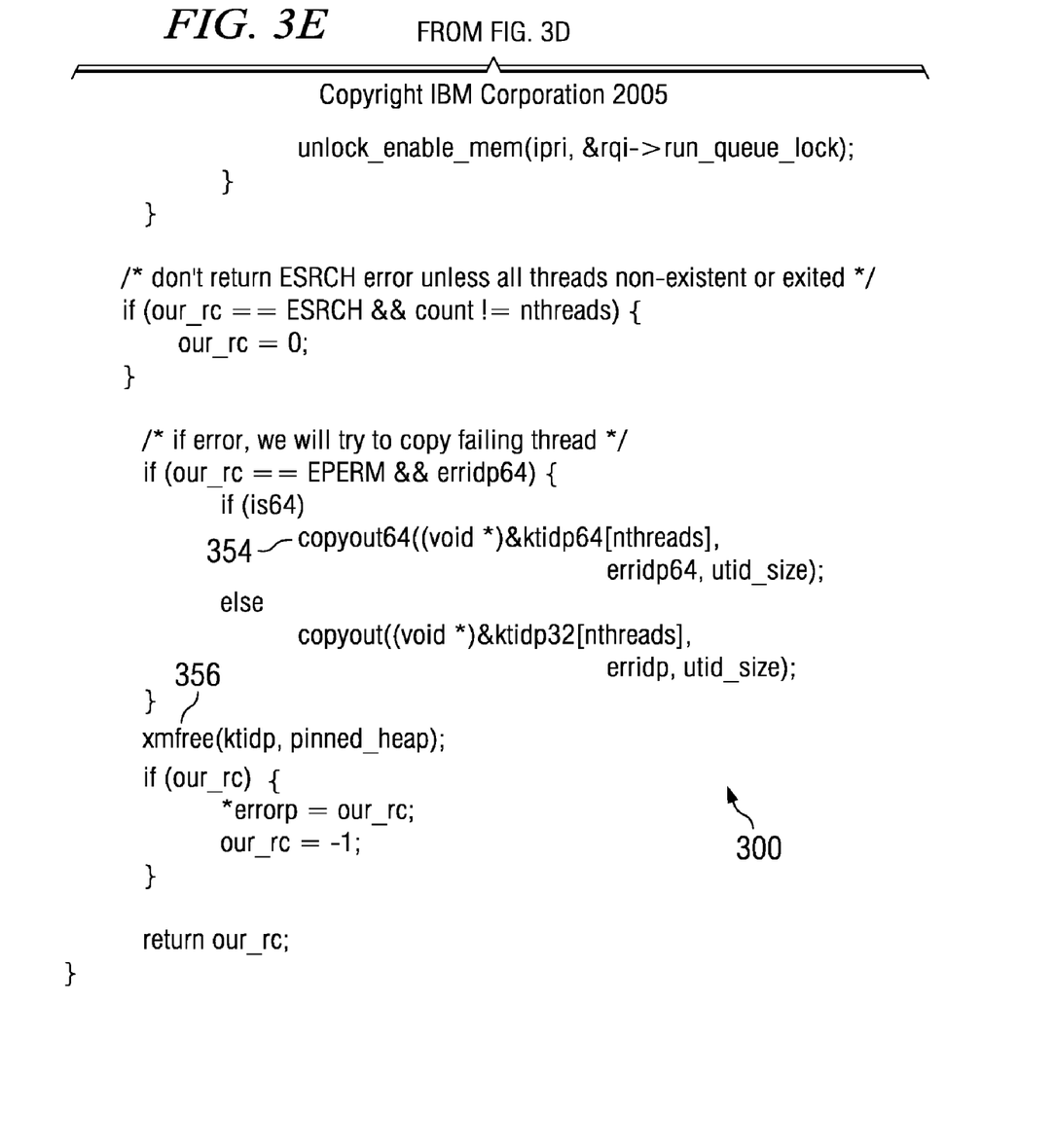

Turning now to FIG. 3E, a diagram illustrating thread_post_many system call 300 in continuation of FIG. 3D is depicted in accordance with an illustrative embodiment of the present invention. As shown in FIG. 3E, if a failure occurs during the wake ups, it is most likely an application failure, because the thread is locked when thread_post_many system call 300 tries to wake it up. In case a failing thread exists, the failing thread ID is copied out from the kernel to user 354. Finally, the memory that is allocated previously is deallocated 356.

Figure 4A:
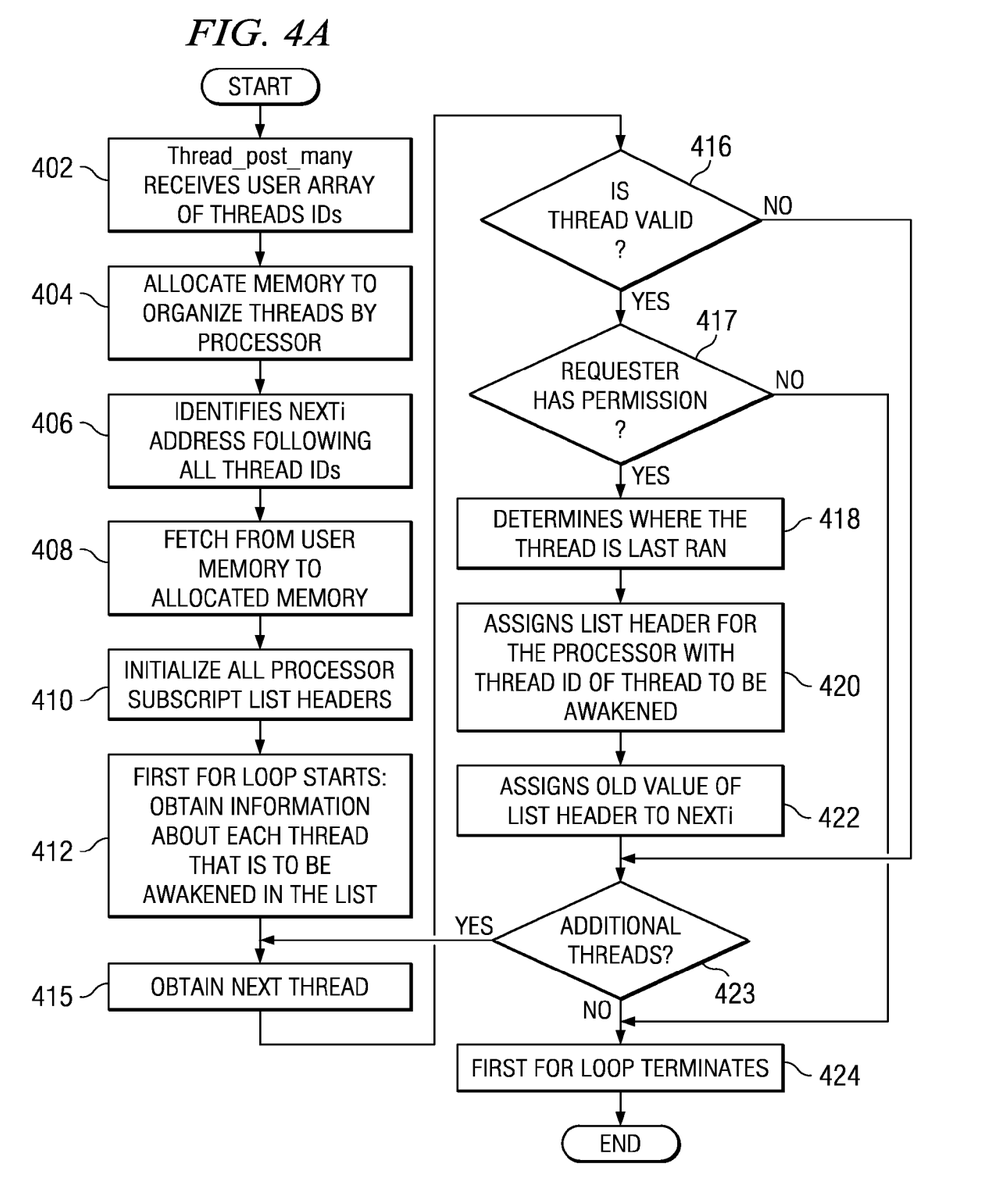
FIGS. 4A-4B are flowcharts of an exemplary process for improving thread posting efficient by awaking client threads based on a given central processing unit on which the client threads are expected to run in accordance with an illustrative embodiment of the present invention.

Turning now to FIG. 4A, a flowchart of an exemplary process for improving thread posting efficiency by awaking client threads based on a given central processing unit on which the client threads are expected to run is depicted in accordance with an illustrative embodiment. This exemplary process may be implemented within a kernel of an operating system, such as the AIX kernel. The process begins when thread_post_many system call receives a user array of thread IDs (step 402). Next, thread_post_many system call allocates memory in order to organize the threads by each processor (step 404).

Thread_post_many system call then identifies nexti address, which follows all the thread IDs in the memory (step 406) and fetches from the user memory to the allocated memory all information about the threads (step 408). A first for loop within thread_post_many system call then initializes all the processor subscript list headers by setting the values to −1 (step 410). Next, a first for loop starts and obtains information about each thread that is to be awakened in the list (step 412).

Then, the next thread is obtained from the list (step 415) and a determination is made as to whether the thread is valid (step 416). If the thread is invalid, the process continues to step 423. If the thread is valid, a determination is made as to whether the requester has permission (step 417). If the requester does not have permission, the first for loop terminates (step 424). However, if the requester has permission, the processor on which the thread is last ran is determined (step 418).

Then, the for loop assigns the list header for the processor, which is where the thread is last ran, with the thread ID of the thread that is to be awakened (step 420). In addition, the old value of the list header is assigned to nexti for the thread (step 422) in order to preserve it. The old value also links the threads to be awakened on a given processor together. At step 423, a determination is made as to whether additional threads are present. If additional threads are present, the process returns to step 415 to obtain the next thread. Otherwise, the first for loop then terminates (step 424) and the process terminates thereafter.

Figure 4B:
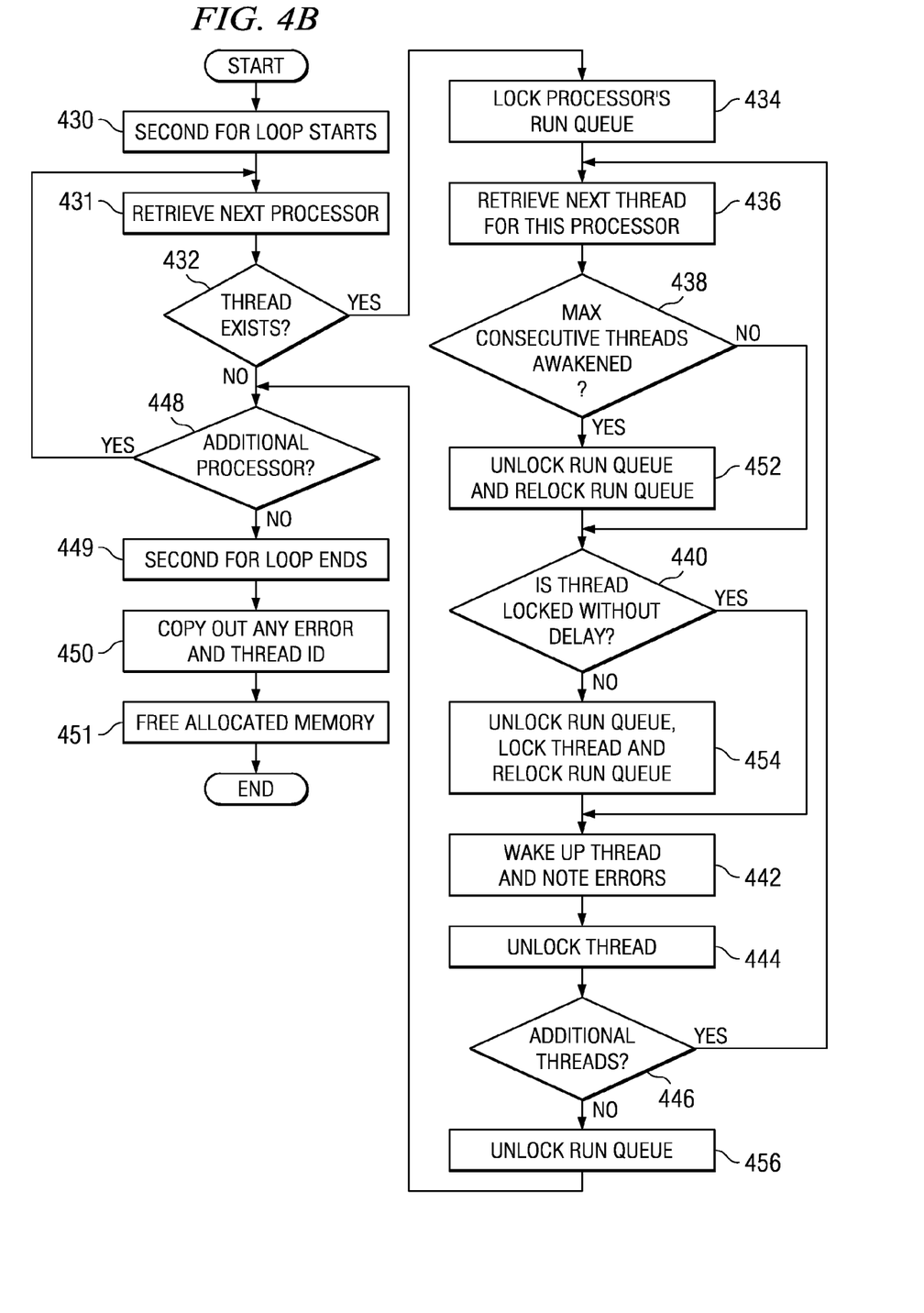

Turning now to FIG. 4B, a flowchart of an exemplary process in continuation of FIG. 4A for improving thread posting efficiency by awaking client threads based on a given central processing unit on which the client threads are expected to run is depicted in accordance with an illustrative embodiment. This process continues from step 424 in FIG.

4A and begins when a second for loop starts (step 430) and retrieves the next processor (step 431). A second for loop then makes a determination as to whether a thread exists by examining the value of the list header of the processor (step 432). If a thread does not exist, a determination is made as to whether additional processors are present (step 448). If additional processors are present, the process returns to step 431 to retrieve the next processor. If additional processors are not present, the process continues to step 449.

Turning back to step 432, if a thread exists, the run queue of the processor is locked (step 434) and a determination is made as to whether a maximum number of consecutive threads is awakened (step 438). The maximum number of consecutive threads to be awakened at one time is a constant known as numberPosts. If the maximum number of consecutive threads is awakened, the run queue of the processor is unlocked and relocked (step 452) and the process continues to step 440. If a maximum number of consecutive threads is not awakened at step 438, the process proceeds to make a determination as to whether the thread is locked without delay (step 440). If the thread is locked without delay, the thread is awakened and any error is noted (step 442). However, if the thread could not be locked without delay, the run queue is unlocked, the thread is locked, and the run queue is relocked (step 454). The process then continues to step 442, where the thread is awakened and any error is noted.

When waking up the thread at step 442, a hidden error recovery is performed by an et_post_rc routine, which makes a determination as to whether the thread is on a wrong run queue, which is different from the run queue that is locked in step 434. If the thread is on a wrong run queue, et_post_rc wakes up the thread by unlocking the wrong run queue, locking the correct run queue, waking up the thread, unlocking the correct run queue, and relocking the wrong run queue.

After the thread is awakened at step 442, the thread is unlocked (Step 444). A determination is then made as to whether additional threads are present (step 446). If additional threads are not present, the run queue of the processor is unlocked (step 456) and returns to step 448 to proceed to the next processor. If additional threads are present, the process returns to step 436 to retrieve the next thread for this processor. If additional processors are absent in step 448, the second for loop then terminates (step 449). Any error that is noted and the thread ID are copied out (step 450) and the allocated memory is freed (step 451). Thus, the process terminates thereafter.

In summary, with the aspects of the present invention, the impact on the processor's memory cache may be minimized because neighboring threads are linked together in a two-way chain when awakened, which affects the cache that is involved in the neighboring threads when each thread is awakened. In addition, as a result of the heap sort, the last thread in the list becomes the first thread that is awakened. In other words, the thread that last ran in the processor becomes the first thread to be awakened. This Last-In-First-Out (LIFO) tendency benefits memory caches, since the last thread that goes to sleep on a processor is most likely the thread that still has data residing in the processor memory cache.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for waking client threads in a multiprocessor data processing system by awaking the client threads based on a given central processing unit on which the client threads are expected to run, the computer implemented method comprising:

receiving a set of threads from an application;
grouping the set of threads with a plurality of processors based on a last execution of the set of threads on the plurality of processors to form a plurality of groups, wherein threads in each group in the plurality of groups are all last executed on a same processor, wherein the grouping step comprises: sorting each thread in the set of threads based on a processor in the plurality of processors that a particular thread last ran on to form a sorted set of threads and selecting, for each processor in the plurality of processors, a subset of threads from the set of sorted threads, wherein the subset of threads forms a group in the plurality of groups and is last executed on a particular processor; wherein the sorting step comprises allocating memory storage for a list header of a processor; identifying link indices, wherein the link indices

13 link the subset of threads for each processor, wherein the link indices utilize processor subscripts for linking the subset of threads; and initializing a value of the list header;
locking a run queue for the same processor;
waking up a first set of threads in a group in the plurality of groups prior to waking up a second set of threads in another group in the plurality of groups, wherein the first set of threads in the first group are woken up in a last-in-first-out order;
unlocking the first set of threads in the first group;
determining whether the first group contains additional threads;
responsive to determining additional threads in the first group, waking up a set of the additional threads up to a maximum consecutive threads to be awakened, without releasing the run queue lock prior to waking up the set of additional threads; and
releasing the run queue lock.

2. The computer implemented method of claim 1, wherein the waking up step comprises:
waking up a single thread within each group in the plurality of groups prior to waking up another thread in each group of the plurality of groups.

3. The computer implemented method of claim 1, wherein the waking up step comprises:
waking up all of the threads in the group in the plurality of groups prior to waking up all of the threads in another group in the plurality of groups.

4. The computer implemented method of claim 1, wherein the sorting step comprises:
determining, for each thread in the set of threads, if the thread is valid and permission exists to wake up the thread;
if the thread is valid and permission exists to wake up the thread, determining a processor on which the thread is last ran; and
assigning a thread identifier of the thread to the list header for the processor on which the thread is last ran.

5. The computer implemented method of claim 4, wherein the assigning step comprises:
preserving a current value of the list header for the processor by assigning the current value to a link index in the link indices associated with the thread.

6. The computer implemented method of claim 5, wherein the waking up step comprises:
determining, for each processor in the plurality of processors, if a thread is present based on the list header;
if the thread is present, locking a run queue of the processor;
retrieving the thread; and
determining if a maximum number of threads for the processor is awakened.

7. The computer implemented method of claim 6, wherein the waking up step further comprises:
if a maximum number of threads for the processor is awakened, unlocking the run queue of the processor; and
relocking the run queue of the processor.

8. The computer implemented method of claim 7, wherein the waking up step further comprises:
if a maximum number of threads for the processor is not awakened, determining if the thread can be locked without delay;
if the thread cannot be locked without delay, unlocking the run queue of the processor;
locking the thread with delay;
relocking the run queue of the processor; and
waking up the thread.

14

9. The computer implemented method of claim 8, wherein the waking up step further comprises:
if the thread is locked without delay, waking up the thread;
determining if additional threads are present in the processor;
if additional threads are absent in the processor, unlocking the run queue of the processor; and
copying out an error if additional processors are absent in the plurality of processors and if one of the subset of threads cannot be awakened.

10. The computer implemented method of claim 9, wherein the waking up step further comprises:
determining if the thread is on a wrong run queue; if the thread is on a wrong run queue, waking up the thread by unlocking the wrong run queue, locking a correct run queue, waking up the thread, unlocking the correct run queue, and relocking the wrong run queue.

11. A data processing system for improving thread posting efficiency by awaking client threads based on a given central processing unit on which the client threads are expected to run, the data processing system comprising:
a bus,
a storage device, wherein the storage device contains computer usable code;
a communications unit connected to the bus; and
a processing unit comprising a plurality of processors connected to the bus, wherein the processing unit executes the computer usable code to receive a set of threads from an application; group the set of threads with a plurality of processors based on a last execution of the set of threads on the plurality of processors to form a plurality of groups, wherein threads in each group in the plurality of groups are all last executed on a same processor, wherein the grouping step comprises: sorting each thread in the set of threads based on a processor in the plurality of processors that a particular thread last ran on to form a sorted set of threads and selecting, for each processor in the plurality of processors, a subset of threads from the set of sorted threads, wherein the subset of threads forms a group in the plurality of groups and is last executed on a particular processor; wherein the sorting step comprises allocating memory storage for a list header of a processor; identifying link indices, wherein the link indices link the subset of threads for each processor, wherein the link indices utilize processor subscripts for linking the subset of threads; and initializing a value of the list header; lock a run queue for the same processor; wake up a first set of threads in a group in the plurality of groups prior to waking up a second set of threads in another group in the plurality of groups, wherein the first set of threads in the first group are woken up in a last-in-first-out order; unlock the first set of threads in the first group; determine whether the first group contains additional threads; responsive to determining additional threads in the first group, wake up a set of the additional threads up to a maximum consecutive threads to be awakened, without releasing the run queue lock prior to waking up the set of additional threads; and release the run queue lock.

12. The data processing system of claim 11, wherein the processing unit, in executing the computer usable code to wake up the threads in a group in the plurality of groups prior to waking up the threads in another group in the plurality of groups, executes the computer usable code to wake up a single thread within each group in the plurality of groups prior to waking up another thread in the each group in the plurality of groups.

13. The data processing system of claim 11, wherein the processing unit, in executing the computer usable code to wake up the threads in a group in the plurality of groups prior to waking up the threads in another group in the plurality of groups, executes the computer usable code to wake up all of the threads in the group in the plurality of groups prior to waking up all of the threads in another group in the plurality of groups.

14. A computer program product stored in memory for improving thread posting efficiency in a multiprocessor data processing system when executed by a processor, said computer usable medium including:

computer usable program code for receiving a set of threads from an application;

computer usable program code for grouping the set of threads with a plurality of processors based on a last execution of the set of threads on the plurality of processors to form a plurality of groups, wherein threads in each group in the plurality of groups are all last executed on a same processor, wherein the grouping step comprises: sorting each thread in the set of threads based on a processor in the plurality of processors that a particular thread last ran on to form a sorted set of threads and selecting, for each processor in the plurality of processors, a subset of threads from the set of sorted threads, wherein the subset of threads forms a group in the plurality of groups and is last executed on a particular processor; wherein the sorting step comprises allocating memory storage for a list header of a processor; identifying link indices, wherein the link indices link the subset of threads for each processor, wherein the link indices utilize processor subscripts for linking the subset of threads; and initializing a value of the list header;

computer usable program code for locking a run queue for the same processor;

computer usable program code for waking up a first set of threads in a group in the plurality of groups prior to waking up a second set of threads in another group in the plurality of groups, wherein the first set of threads in the first group are woken up in a last-in-first-out order;

computer usable program code for unlocking the first set of threads in the first group;

computer usable program code for determining whether the first group contains additional threads;

responsive to determining additional threads in the first group, computer usable program code for waking up a set of the additional threads up to a maximum consecutive threads to be awakened, without releasing the run queue lock prior to waking up the set of additional threads; and computer usable program code for releasing the run queue lock.

15. The computer program product of claim 14, wherein the computer usable program code for waking up the threads in a group in the plurality of groups prior to waking up the threads in another group in the plurality of groups comprises:

computer usable program code for waking up a single thread within each group in the plurality of groups prior to waking up another thread in the each group of the plurality of groups.

* * * * *